A. A. PAULY.
MOLDING APPARATUS.
APPLICATION FILED MAR. 27, 1915. RENEWED JAN. 31, 1918.
1,339,712.
Patented May 11, 1920.
3 SHEETS—SHEET 1.
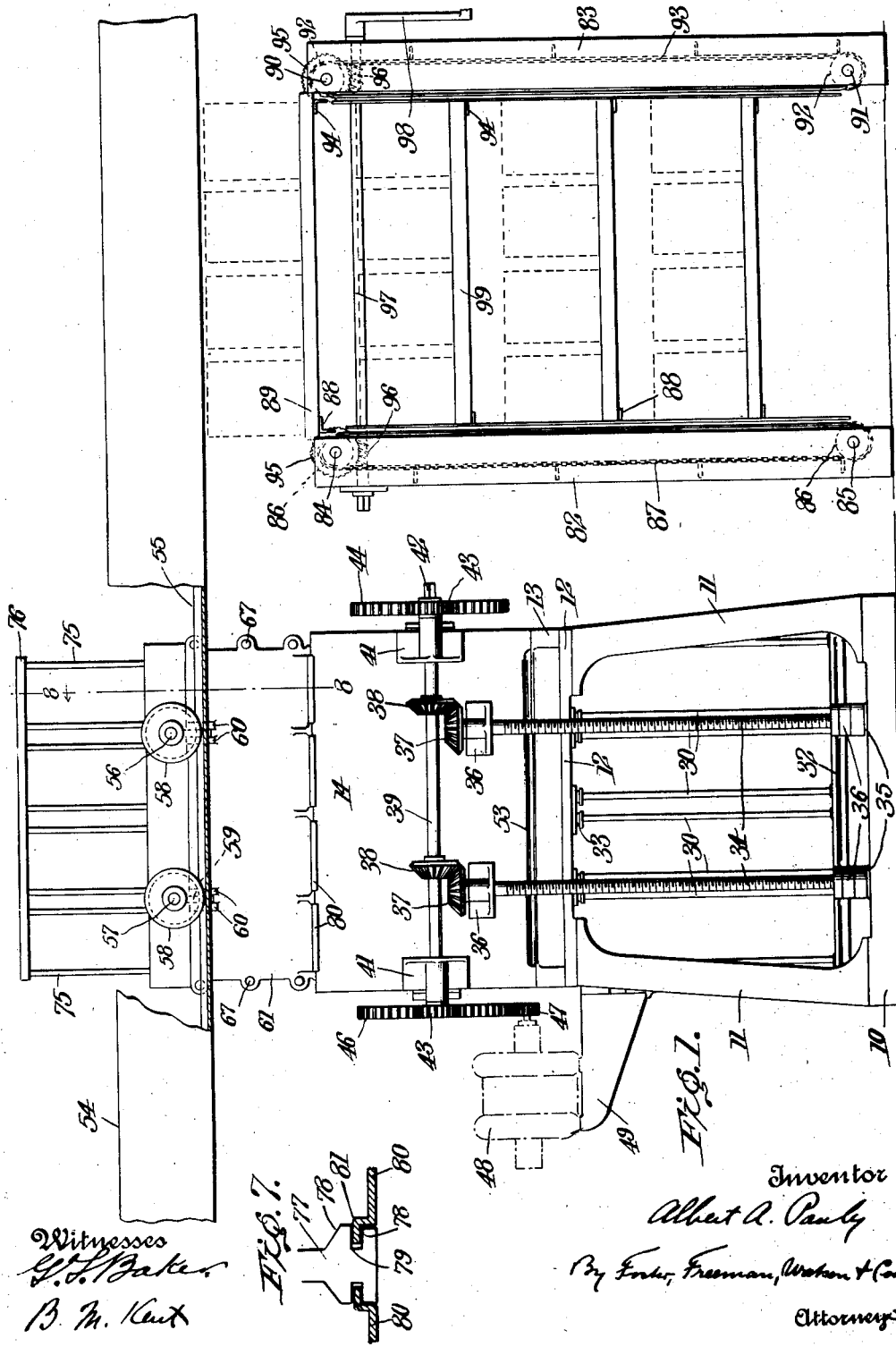
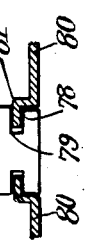
Witnesses
G. L. Baker
B. M. Kent
Inventor
Albert A. Pauly
By Foster, Freeman, Watson & Coit
Attorneys

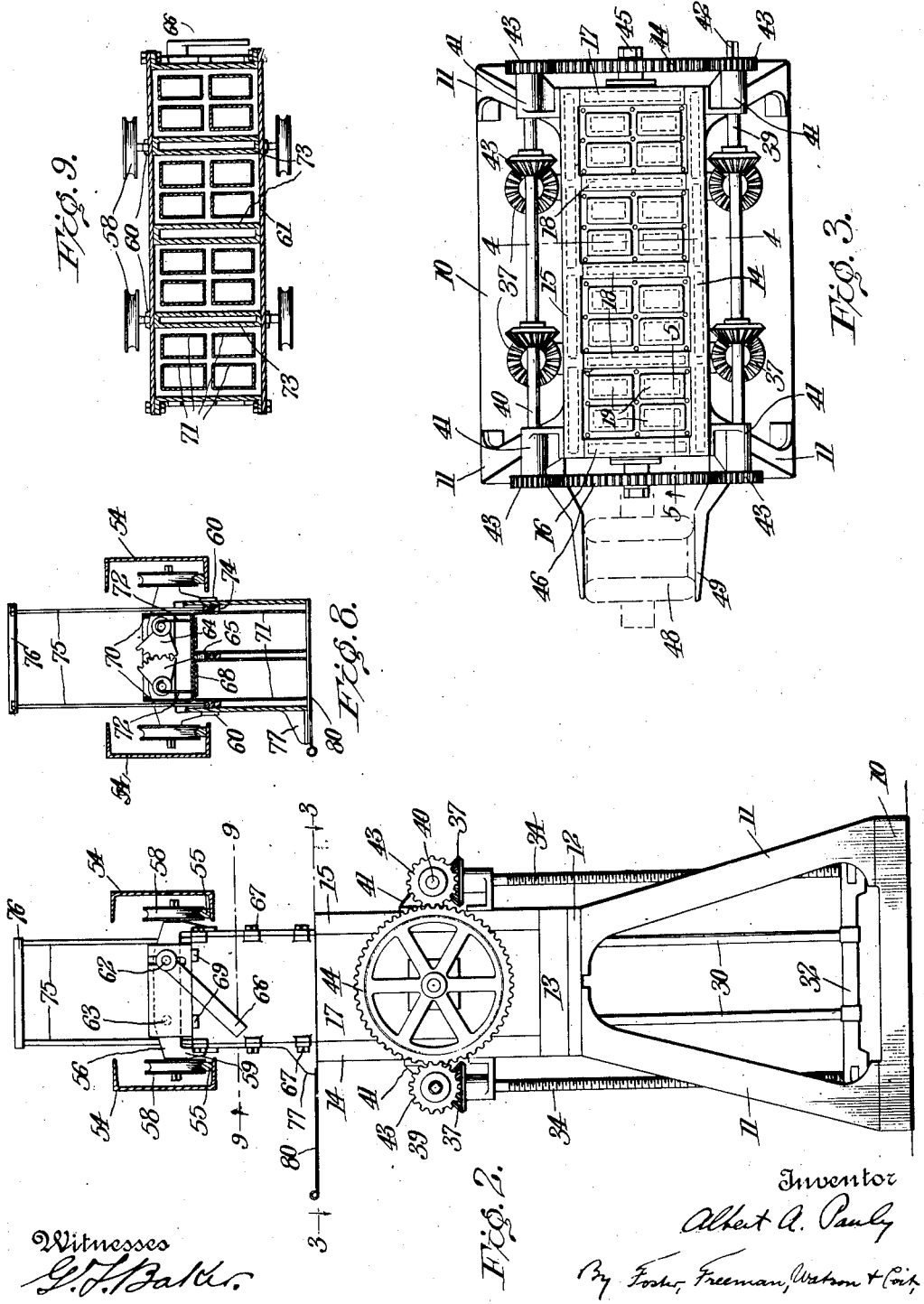

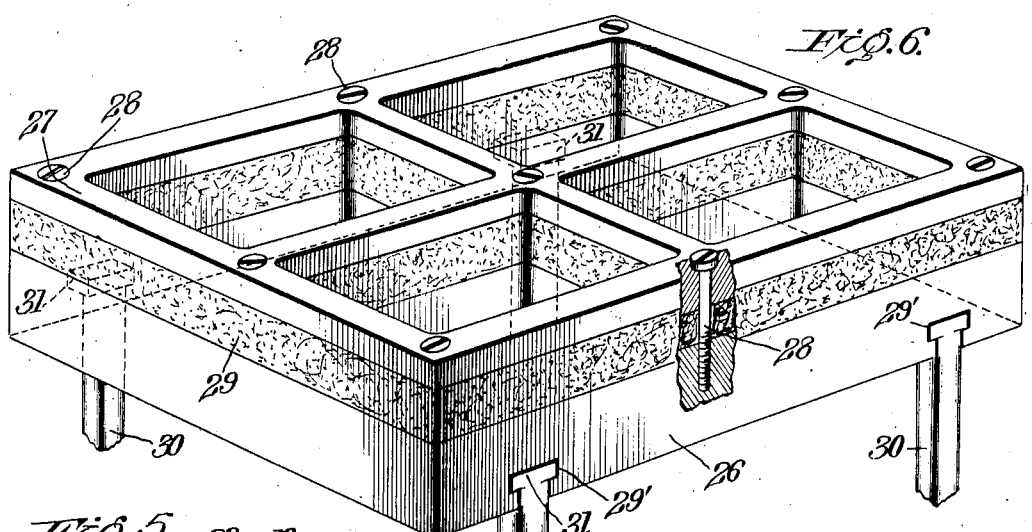
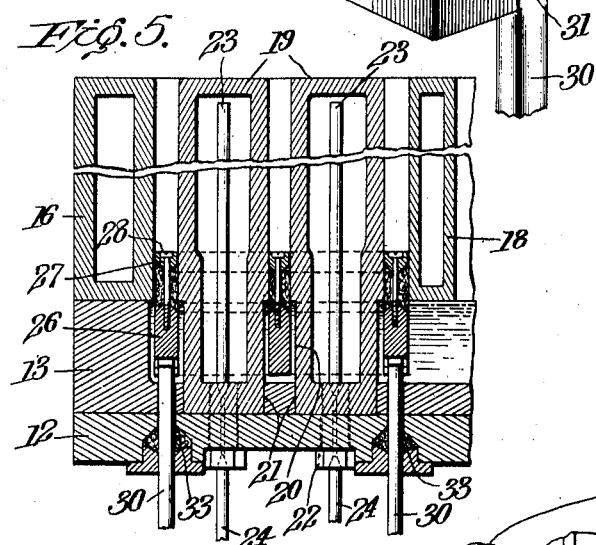
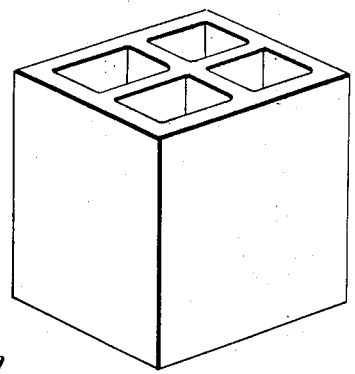
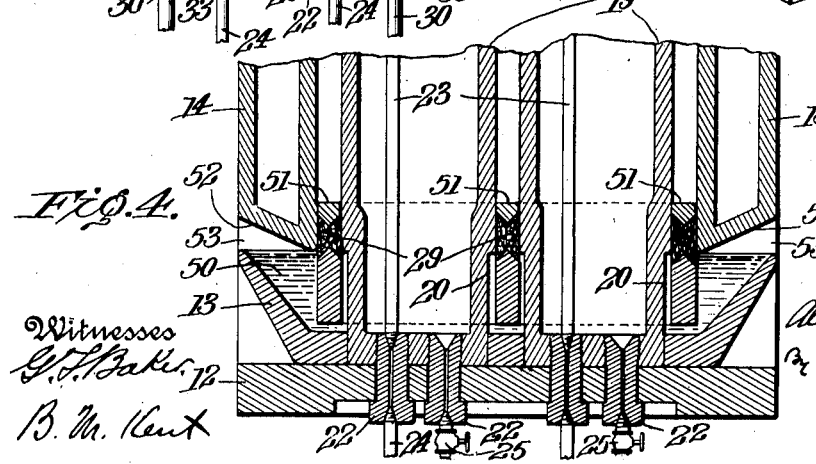

UNITED STATES PATENT OFFICE.

ALBERT A. PAULY, OF CLEVELAND, OHIO.

MOLDING APPARATUS.

1,339,712. Specification of Letters Patent. Patented May 11, 1920.

Application filed March 27, 1915, Serial No. 17,457. Renewed January 31, 1918. Serial No. 214,786.

*To all whom it may concern:*

Be it known that I, ALBERT A. PAULY, a citizen of the United States, and resident of Cleveland, county of Cuyahoga, and State of Ohio, have invented certain new and useful Improvements in Molding Apparatus, of which the following is a specification.

This invention relates to apparatus for molding hollow tile, brick and other objects from Portland cement, or its equivalent in combination with ashes, sand or other suitable material, or from gypsum or plaster.

The principal object of the invention is to provide an improved form of apparatus for this purpose whereby the articles may be produced in the most expeditious manner and at a minimum cost.

In making articles of concrete, one of the principal items of expense is the handling of the articles, and in accordance with the present invention I have provided simple and inexpensive means for rapidly handling the articles, while green, with the minimum amount of breakage.

With the foregoing and other objects in view, as will appear from the following description, the invention may be embodied in various forms of apparatus one of which is illustrated in the accompanying drawings.

In the drawings:

Figure 1 is a side elevation of an article molding machine and the article handling mechanism associated therewith;

Fig. 2 is a section on the line 2—2 of Fig. 1;

Fig. 3 is a plan view of the molding apparatus;

Fig. 4 is a section on the line 4—4 of Fig. 3;

Fig. 5 is a section on the line 5—5 of Fig. 3;

Fig. 6 is a perspective view of the mold plunger;

Fig. 7 is an enlarged fragmentary section showing in detail the manner of supporting the edges of the cutting knives;

Fig. 8 is an enlarged section on the line 8—8 of Fig. 1;

Fig. 9 is a section on the line 9—9 of Fig. 2;

Fig. 10 is a perspective view of a tile such as is made in the machine illustrated.

In accordance with the present invention the concrete, in a liquid form, is poured into heated molds in which it is allowed to remain for from two to three minutes, or until it has set sufficiently to permit handling. The articles, in the preferred form of the invention, are then forced upwardly out of the molds into a skeleton transporting form which is provided with a cutting knife at the bottom thereof and by means of this knife the articles are cut into sections and the sections transferred to suitable conveying apparatus which carries the articles to the kiln in which they are cured.

Referring to the drawings, 10 indicates a base plate on which are secured legs 11, these legs supporting a plate 12 on which there is a trough-shaped bed 13. The side walls 14 and 15 of the mold are supported on the bed 13 and coöperate with the end walls 16 and 17 and the partitions 18 to form a plurality of chambers in which the articles are cast. As shown in Fig. 3, the casting machine contains four of these chambers and in each chamber there are four core members 19 which are spaced from the walls of the chamber and from each other to form the molds for making tiles such as illustrated in Fig. 10. It will be seen that this tile is a hollow rectangular structure provided with right angularly arranged partitions or reinforcing webs. The cores 19 have their lower ends reduced in size as indicated at 20 and project through openings 21 in the bed 13. The cores are secured in position by means of bolts 22 which project through the plate 12 and have screw-thread connections with the core members, as clearly shown in Figs. 4 and 5. The core members are hollow and the bolts 22 have longitudinal passages therein. One of the bolts 22, connected with each of the core members, has secured to the upper end thereof a pipe 23 which is open at its upper end and is adapted to convey steam to the upper part of the core, the steam being supplied by a pipe 24. The other bolt, 22, of each of the cores has secured thereto a drain pipe which may be provided with a control valve indicated at 25. The side walls 14 and 15 and the end walls 16 and 17 are hollow and may be supplied with steam in any suitable manner. The partitions 18 are also hollow and supplied with steam so that all of the walls of the mold are heated to the proper temperature.

Arranged in each of the chambers of the mold is a plunger which is shown in detail in Fig. 6. These plungers comprise a main body 26 in the form of a grid and a grid plate 27 of the same shape and secured to the body 26 by a plurality of screws 28. Between the body 26 and the plate 27 there is arranged packing material 29, this packing material being preferably of a fibrous nature which is adapted to absorb a lubricating oil. Each of the plungers is provided with four symmetrically arranged T slots 29' on the lower side thereof, and oval plunger rods 30 having T heads 31 fitting slots 29', project through the bottom wall of the bed 13 and through the plate 12 and are connected at their lower ends with a cross head 32. Stuffing boxes 33 are arranged on the under side of the plate 12 and prevent leakage of oil downwardly along the rods 30, from the bed 13. The cross head 32 is raised and lowered by means of four screw-threaded shafts 34, arranged in pairs on opposite sides of the machine and having their lower ends supported in bearings 35. The cross head 32 carries nuts 36 which coöperate with the threaded shafts 34 so that when the shafts are rotated the cross head will be raised or lowered in accordance with the direction of rotation of the shafts. For the purpose of rotating the shafts they are provided at their upper ends with bevel gears 37 and these gears are rotated by gears 38 arranged on shafts 39 and 40 on opposite sides of the machine. The shafts 39 and 40 are supported in bearings 41 and the shaft 39 is provided with a squared end 42 adapted to receive a crank whereby it may be rotated manually. The shafts 39 and 40 are provided at their opposite ends with pinions 43, the pinions at one end of the machine meshing with a gear 44 which is rotatably mounted on a stub shaft 45 and the pinions 43 at the opposite end of the machine mesh with a gear 46 which is suitably supported and preferably driven by a pinion 47 on the shaft of a motor 48, this motor being shown diagrammatically on a suitable bracket 49 therefor.

The system of gearing just described is adapted to effect the simultaneous rotation of all of the shafts 34 either by the motor 48 or by means of a crank attached to the shaft 39. In this way all parts of the cross head 32 will be given a uniform movement and this uniform movement will be transmitted to all of the plungers in the casting chambers, by means of the rods 30.

Referring to Fig. 4, it will be seen that the bed 13 is trough-shaped and adapted to contain a body of lubricating oil which is indicated at 50. In this figure the parts of one of the plungers are indicated at 51 and the level of the oil in the bed 13 is maintained at a sufficient height to permit the packing 29 of the plunger to dip into it when the plunger is in its lowest position. The packing thus absorbs some of the oil, which is conveyed upwardly through the packing in much the same manner that oil ascends a lamp wick. In order to provide means for supplying oil to the reservoir, in the bed 13, the side walls 14 and 15 have their lower portions beveled as indicated at 52 thereby forming, with the upper edge of the bed, slots 53 as shown in Figs. 1 and 4. These slots are also employed for the purpose of cleaning out the oil reservoir and permit a steam jet or other agency to be employed for this purpose.

In the operation of the molding machine the four casting chambers or molds are filled, above the plungers, with the liquid concrete material and, on account of the walls of the chambers being heated, the concrete quickly sets and after a lapse of from two to three minutes the articles are sufficiently hard to permit of their being ejected from the molds. When it is desired to eject the articles the shafts 34 are operated, either by the motor 48 or a crank, as above described, and the plungers are moved upwardly. The plunger packing wipes over the surfaces of the mold and thus lubricates these surfaces so that when the next batch of concrete material is run into the molds the oil on the surfaces will prevent the concrete from adhering. In this way it is possible to produce articles having smooth exterior surfaces and the lubrication of the mold surfaces also facilitates the ejection of the articles. The normal position of the plunger is at the bottom of the mold as indicated in Figs. 4 and 5 and while the concrete material is being run into the molds and being allowed to set there is time for the packing material to absorb the requisite amount of lubricant for lubricating the mold surfaces upon the next reciprocation of the plunger. By reducing the size of the lower ends of the cores, as indicated at 20, oil spaces are provided around the plunger so that the oil will have access to all parts of the packing. The packing material also serves to clean the surfaces of the mold and in this way improves the quality of the articles produced.

The packing will be subjected to wear on account of wiping over the mold surfaces upon each reciprocation of the plunger and it therefore is necessary to renew the packing at intervals and in order to permit the renewal of the packing without delaying the operation of the machine materially I have provided means whereby the plungers may be readily detached from their actuating rods 30. From Fig. 6 it will be seen that the plungers are connected with the actuating rods by coöperating T heads and slots which will permit the plungers to be withdrawn from the rods by a lateral movement when the plungers are projected beyond the upper edges of the molds. One or more extra plungers will be preferably provided with the apparatus and when one of the plungers is removed an extra plunger, on which the packing material has been previously renewed, will be substituted, and thus the operation of the machine may proceed without it being necessary to delay the operation until the packing material of the plunger is renewed. It will be understood that other forms of connection may be provided between the rods 30 and the plungers which will serve the same purpose as the T heads 31 in permitting the plungers to be readily detached from their actuating rods.

The articles when ejected from the molds are in a condition in which they have to be very carefully handled and in order to protect the articles I prefer to eject them into skeleton forms which will give the requisite support and prevent crumbling. Arranged above the casting machine and supported in any suitable manner is a track way, which in the drawings comprises a pair of oppositely faced channel beams 54 which carry rails 55 on their lower flanges. A pair of axles 56 and 57 have wheels 58 at the ends thereof, these wheels running on the rails 55. The axles 56 and 57 are each provided with a pair of downwardly projecting lugs 59 which coöperate with pairs of lugs 60 on the side walls of a skeleton form 61 for the purpose of guiding the latter in its vertical movement. Shafts 62 and 63 are journaled in the axles 56 and 57 and form a connection between the axles, these shafts being geared together by means of gear segments 64 and 65. The shaft 62 has secured thereto an operating handle 66. The skeleton form 61 consists of a rectangular box having side and end walls which are clamped together by bolts 67 and a top wall 68 which is secured to lugs 69 on said end walls. From Fig. 8 it will appear that the top wall 68 is of slightly less width than the interior of the skeleton form and is provided with upwardly projecting sides 70 which are provided with suitable slots (not shown) for the axles 56 and 57. The top wall 68 has secured to the under side thereof downwardly projecting cores 71 of substantially the same external dimensions as the cores 19. It will be understood, however, that the dimensions of the cores 71 and the interior of the skeleton form are such that the spaces provided for the articles are slightly larger than the corresponding spaces in the molds so that the articles may be moved into and out of the skeleton form with freedom although the walls of the form will at all times support all parts of the articles. The shafts 62 and 63 each have wound thereon a pair of flexible cables or chains 72 which have their lower ends attached to the wall 68 as shown in Fig. 8. When the shafts 62 and 63 are turned, through the medium of the handle 66, the cables 72 will be wound or unwound and thus raise or lower the skeleton form relatively to the axles.

The skeleton form has arranged therein partitions 73 corresponding with the partitions 18, these partitions dividing the form into chambers which are similar to the mold chambers and adapted to register therewith when the form is placed on top of the molds. Each of these chambers, in the form, has arranged therein a plunger 74 and these plungers have secured thereto upwardly projecting rods 75 which carry at their upper ends a tray 76, this tray being common to all of the plungers. The plungers 74 are preferably constructed in a manner similar to the plunger shown in Fig. 6 and provided with packing material which wipes over the surfaces of the form and lubricates these surfaces. For the purpose of supplying lubricant to the packing of the plungers 74 a small body of the lubricant is maintained on top of the plungers and moves therewith. This lubricant saturates the packing and facilitates the movement of the articles into and out of the form.

One of the side walls of the form is provided with laterally projecting brackets 77 having horizontally arranged lips 78 which form grooves 79, these grooves registering with similar grooves at the bottom of the end walls and the partitions 73. Sliding plates 80 having off-set edges 81 which engage the grooves 79 are adapted to be moved to and from a position under the chambers of the skeleton form. The plates 80 are preferably made of thin steel and act as cutters to sever the portions of the articles in the form from the portions in the molds. By off-setting the edges of the plates 80, as indicated at 81, the plates are positioned substantially at the bottom of the form and when the form rests on the molds the plates are adapted to cut through the articles at the top of the molds. On account of the skeleton form being lowered on to the molds, before the plates are moved to cut the articles, the articles will be interiorly and exteriorly supported throughout their lengths and the forcing of the thin plates 80 through them will not have a crumbling action.

After the skeleton form has been lowered on to the top of the molds the shafts 34 are rotated to raise the mold plungers and force the articles from the molds into the form. The molds are made of sufficient depth to permit the castings to be cut into several sections to form articles of standard size and when the mold plungers have been raised the proper distance the rotation of the shafts 34 is interrupted and the plates 80 are pushed through the articles to sever the portions which are in the form from the portions which are in the mold and provide supports for the former portions. When the plates 80 have been forced in to the limit the handle 66 is swung to lift the form from the mold. The form with its supporting axles and wheels constitutes a carrier which may be moved from its position above the casting machine to a position over an elevator on which the articles are deposited from the form. This elevator is shown in Fig. 1 and comprises oppositely arranged frames 82 and 83. The frame 82 carries upper and lower shafts 84 and 85 respectively on which are arranged sprocket wheels 86 over which a pair of conveyer chains 87 pass. The conveyer chains 87 are provided with attachments 88 in the form of angle irons which serve as supports for one end of a board 89 upon which the articles are deposited from the skeleton form. The frame 83 supports shafts 90 and 91 which are provided with sprocket wheels 92 for a pair of conveyer chains 93 similar to the chains 87 and provided with attachments 94 which are similar to the attachments 88. The board 89 rests upon the oppositely arranged attachments 88 and 94 and the carrier is moved to a position over the board 89 and the skeleton form is lowered on to the board by swinging the handle 66. The plates 80 are then withdrawn from under the articles and the conveyer chains 87 and 93 are actuated to lower the board 89 away from the skeleton form. For the purpose of moving the chains 87 and 93 the shafts 84 and 90 are each provided with a worm wheel 95 with which worms 96 on a cross shaft 97 mesh. The shaft 97 is supported in suitable bearings in the frames 82 and 83 and provided with a handle 98 by means of which it is rotated. As the board 89 is lowered away from the skeleton form the articles move out of the form due to their own weight and the weight of the plunger 74 and the tray 76. The tray 76 may be loaded as desired for the purpose of insuring the ejection of the articles from the skeleton form. The shaft 97 is rotated until the board 89 is lowered to the position of the board 99. Another pair of attachments 88 and 94 will then be in position to support a board in the position of the board 89. The skeleton form is then raised by means of the handle 66 and returned to position on the mold when the operation of ejecting the articles from the mold and cutting them off and transferring them to the elevator is repeated. The operation continues until the bottom sections of the articles have been removed from the molds and then the mold plungers are lowered and the casting operation repeated.

Having thus described my invention, what I claim is:—

1. In apparatus of the class described, the combination of a mold, a transporting member adapted to receive the article as it is ejected from said mold, means carried by said member adapted to be moved under the article and support it, and means for receiving the article from said member when the first mentioned means is withdrawn from under the article.

2. In apparatus of the class described, the combination of a mold, a transporting member adapted to receive the article as it is ejected from said mold, a supporting and cutting plate carried by said member adapted to sever a portion of the article from the portion in the mold and support the former portion, and means for receiving the article from said member when said plate is withdrawn.

3. In apparatus of the class described, the combination of an open-top mold, a transporting form adapted to be arranged in registering position above said mold, means for ejecting the article from said mold into said form, means carried by said form adapted to support the article thereon, and means for receiving the article from said form when the second-mentioned means is withdrawn.

4. In apparatus of the class described, the combination of an open-top mold, a transporting form adapted to be arranged in registering position above said mold, means for ejecting the article from said mold into said form, and a plate carried by said form adapted to be moved to sever the article so as to separate the portion in the form from the portion in the mold and support the former portion.

5. In apparatus of the class described, the combination of an open-top mold, a transporting form movably mounted above the mold and adapted to be arranged in registering position thereon, means for ejecting the article from said mold into said form, a plate slidably mounted on said form and adapted to be moved over the top of the mold to sever the article so as to separate the portion in the form from the portion in the mold and support the former portion, and means for receiving the article from said form when said plate is withdrawn from under the article.

6. In apparatus of the class described, the combination of an open-top mold, a carrier, a transporting form on said carrier adapted to be arranged in registering position above said mold, means whereby said form is moved vertically to and from said mold, means for ejecting the article from said mold into said form, and a plate carried by said form adapted to be moved into position to support the article in the form while the latter is being transported.

7. In apparatus of the class described, the combination of an open-top mold, a carrier, a transporting form on said carrier adapted to be arranged in registering position above said mold, means on the carrier adapted to raise and lower said form relatively to the mold, and a plate carried by said form and slidable into position to support the article thereon while the form is being transported.

8. In apparatus of the class described, the combination of an open-top mold, a transporting form adapted to be arranged in registering position above said mold, means for ejecting the article from said mold into said form, and a plate slidably mounted on said form at the bottom thereof and adapted to sever the article so as to separate the portion thereof which is in the form from the portion which is in the mold and support the former portion.

9. In apparatus of the class described, the combination of a mold, a transporting form adapted to be arranged in registering relation with said mold, means for supporting the article in said form, means for ejecting the articles from said mold into said form, and a plunger in said form adapted to eject the articles upon the withdrawal of said supporting means.

10. In apparatus of the class described, the combination of a mold, a form adapted to be arranged in registering relation with said mold and into which the articles are ejected from the mold, a plunger in said form adapted to eject the articles therefrom, a plurality of rods extending upwardly from said plunger and secured thereto, and means connecting the upper ends of said rods together.

11. In apparatus of the class described, the combination of a mold, a form adapted to be arranged in registering relation with said mold and into which the articles are ejected from the mold, a plunger in said form adapted to eject the articles therefrom, a plurality of rods extending upwardly from said plunger and secured thereto, and a tray secured to the upper ends of said rods and adapted to receive weights for the purpose of aiding the plunger in ejecting the articles from said form.

12. In apparatus of the class described, the combination of a mold, a form adapted to be arranged in registering relation with said mold, means for ejecting the articles from said mold into said form, a plunger arranged in said form and adapted to eject the articles therefrom, packing means for said plunger, and means for automatically supplying lubricant to said packing means.

13. In apparatus of the class described, the combination of a mold, a form adapted to be arranged in registering relation with said mold, means for ejecting the articles from said mold into said form, a plunger in said form arranged to be actuated by gravity to eject the articles therefrom, and means for automatically lubricating said plunger.

In testimony whereof I affix my signature.

ALBERT A. PAULY.